United States Patent
Holstine et al.

(10) Patent No.: US 11,713,127 B2
(45) Date of Patent: Aug. 1, 2023

(54) MULTI-SEAT ESCAPE SYSTEM AND EJECTION SEAT SEQUENCER

(71) Applicant: AMI Industries, Inc., Colorado Springs, CO (US)

(72) Inventors: Steve Holstine, Peyton, CO (US); Luis G. Interiano, Galt, CA (US); Jeff Benjamin, Colorado Springs, CO (US); John Hampton, Colorado Springs, CO (US); Kassidy L. Carson, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 36 days.

(21) Appl. No.: 17/549,634

(22) Filed: Dec. 13, 2021

(65) Prior Publication Data
US 2023/0182907 A1    Jun. 15, 2023

(51) Int. Cl.
*B64D 25/10* (2006.01)

(52) U.S. Cl.
CPC .................... *B64D 25/10* (2013.01)

(58) Field of Classification Search
CPC ....................................................... B64D 25/10
See application file for complete search history.

(56) References Cited

U.S. PATENT DOCUMENTS

| | | | |
|---|---|---|---|
| 11,427,339 B2 * | 8/2022 | Salois | B64D 11/0689 |
| 2020/0361614 A1 * | 11/2020 | Benjamin | G05B 19/0426 |
| 2021/0147089 A1 * | 5/2021 | Dunst | B64D 25/10 |
| 2021/0179280 A1 | 6/2021 | Rodriguez et al. | |
| 2021/0180557 A1 * | 6/2021 | Rodriguez | B64D 25/10 |
| 2022/0227496 A1 * | 7/2022 | Holstine | B64D 25/10 |

* cited by examiner

Primary Examiner — Richard G Davis
(74) Attorney, Agent, or Firm — Snell & Wilmer L.L.P.

(57) ABSTRACT

An article of manufacture may include a tangible, non-transitory computer-readable storage medium having instructions stored thereon for controlling deployment of aircraft escape and ejection seat subsystems. The instructions, in response to execution by a first sequencer, cause the first sequencer to perform operations which may comprise receiving a power input, determining a seat location and a seat identity of a first ejection seat in which the first sequencer is installed, determining an ejection mode, sending a first deploy command to an escape path clearance subsystem, determining a deployment sequence for a seat rocket catapult subsystem and a plurality of ejection seat subsystems of the first ejection seat based on the seat location, the seat identity, and the ejection mode, sending a second deploy command to the seat rocket catapult subsystem, and sending a series of third deploy commands to the plurality of ejection seat subsystems.

20 Claims, 5 Drawing Sheets

MULTI-SEAT ESCAPE SYSTEM AND EJECTION SEAT SEQUENCER

FIELD

The present disclosure relates to ejection systems and, more particularly, to multi-seat ejection systems and sequencers for multi-seat ejection systems.

BACKGROUND

Ejection systems are designed to expel ejection seats and their occupants from an aircraft. Typical ejection systems include an aircraft escape sequencer and an ejection seat sequencer. The aircraft escape sequencer generally controls and deploys an escape path clearance subsystem and a rocket catapult subsystem. The ejection seat sequencer generally controls the timing sequence and deployment of the ejection seat subsystems (e.g., deployment the drogue parachute, the main parachute, the aircrew restraint release, etc.). Using two separate, discrete sequencers tends to increase weight, part count, and costs.

Various aircraft include a multi-seat ejection system, wherein, for example, a pilot ejection seat and a co-pilot ejection seat are expelled from the aircraft. Current multi-seat ejection systems generally include an ejection mode select system, which allows a flight crew member to manually select which ejection seats will be ejected upon deployment of the ejection system and whether initiation of the ejection sequence by the co-pilot ejection seat will also initiate deployment of the pilot ejection seat. The seat sequencers need to be able to determine which ejection seats are to deploy so that they may select the proper timing for deployment of the ejection seat subsystems.

SUMMARY

Disclosed herein, in accordance with various embodiments, is an article of manufacture including a tangible, non-transitory computer-readable storage medium having instructions stored thereon for controlling deployment of aircraft escape subsystem and ejection seat subsystems. The instructions, in response to execution by a first sequencer, cause the first sequencer to perform operations, which may comprise receiving, by the first sequencer, a power input; determining, by the first sequencer, a seat location and a seat identity of a first ejection seat in which the first sequencer is installed; determining, by the first sequencer, an ejection mode; sending, by the first sequencer, a first deploy command to an escape path clearance subsystem; determining, by the first sequencer, a deployment sequence for a seat rocket catapult subsystem and a plurality of ejection seat subsystems of the first ejection seat based on the seat location, the seat identity, and the ejection mode; sending, by the first sequencer, a second deploy command to the seat rocket catapult subsystem; and sending, by the first sequencer, a series of third deploy commands to the plurality of ejection seat subsystems.

In various embodiments, the operations further comprise receiving, by the first sequencer, an output from an ejection mode selector; determining, by the first sequencer, the ejection mode based on the output from the ejection mode selector; and determining, by the first sequencer, whether to power-on a second sequencer located in a second ejection seat based on the seat identity and the ejection mode.

In various embodiments, the operations further comprise determining, by the first sequencer, whether a first connector has disconnected from a second connector; and sending, by the first sequencer, the second deploy command to the seat rocket catapult subsystem in response to determining the first connector has disconnected from the second connector. A first wire bundle is connected between the first connector and the escape path clearance subsystem. A second wire bundle is connected between the second connector and the first sequencer.

In various embodiments, the operations further comprise determining, by the first sequencer, a time delay for sending the second deploy command to the seat rocket catapult subsystem after determining the first connector has disconnected from the second connector. The time delay is determined based on the seat location, the seat identity, and the ejection mode.

In various embodiments, the operations further comprise determining, by the first sequencer, whether to fire a first clearance assembly of the escape path clearance subsystem, a second clearance assembly of the escape path clearance subsystem, or both the first clearance assembly and the second clearance assembly, based on the seat location, the seat identity, and the ejection mode. The first clearance assembly is configured to remove a first portion of an aircraft canopy. The second clearance assembly is configured to remove a second portion of the aircraft canopy.

In various embodiments, sending, by the first sequencer, the first deploy command to the escape path clearance subsystem comprises sending, by the first sequencer, the first deploy command to at least one of the first clearance assembly or the second clearance assembly.

In various embodiments, receiving, by the first sequencer, the power input comprises at least one of receiving, by the first sequencer, the power input from a first seat primary power source, the first seat primary power source being configured to begin supplying current to the first sequencer in response to actuation of a first seat handle; or receiving, by the first sequencer, the power input from a first seat auxiliary power source, the first seat auxiliary power source being configured to begin supplying current to the first sequencer in response to receiving a signal output by the second sequencer.

Also disclosed herein is a multi-seat ejection system. In accordance with various embodiments, the multi-seat ejection system may comprise a first ejection seat including a first sequencer and a second ejection seat including a second sequencer. An escape path clearance subsystem may be operably coupled to the first sequencer and the second sequencer. A first seat rocket catapult subsystem is configured to expel the first ejection seat and to receive a first deploy command from the first sequencer. A second seat rocket catapult subsystem is configured to expel the second ejection seat and receive a second deploy command from the second sequencer. A plurality of first ejection seat subsystems is located on the first ejection seat and is configured to receive a series of third deploy commands from the first sequencer. A plurality of second ejection seat subsystems is located on the second ejection seat and is configured to receive a series of fourth deploy commands from the second sequencer.

In various embodiments, a first seat primary power source is connected to the first sequencer and a first seat handle is configured to activate the first seat primary power source. A first seat auxiliary power source is connected to the first sequencer and is configured to supply current to the first sequencer in response to receiving a first activate signal output by the second sequencer. A second seat primary power source is connected to the second sequencer. A second seat handle is configured to activate the second seat primary power source. A second seat auxiliary power source is connected to the second sequencer and is configured to supply current to the second sequencer in response to receiving a second activate signal output from the first sequencer.

In various embodiments, the ejection system further comprises a first connector including a first pin configuration, and a second connector including a second pin configuration. The second pin configuration is different from the first pin configuration. The first sequencer is configured to determine a seat location of the first ejection seat and a seat identity of the first ejection seat based on the first pin configuration. The second sequencer is configured to determine a seat location of the second ejection seat and an identity of the second ejection seat based on the second pin configuration.

In various embodiments, an ejection mode selector is in communication with the first sequencer and the second sequencer. In various embodiments, the first sequencer is configured to determine an ejection mode based on an output from the ejection mode selector. The first sequencer determines a first deployment sequence for the first seat rocket catapult subsystem and the plurality of first ejection seat subsystems based on the seat location of the first ejection seat, the seat identity of the first ejection seat, and the ejection mode.

In various embodiments, the second sequencer is configured to determine a second deployment sequence for the second seat rocket catapult subsystem and the plurality of second ejection seat subsystems based on the location of the second ejection seat, the identity of the second ejection seat, and the ejection mode.

In various embodiments, the first sequencer is configured to determine whether to power-on the second sequencer based on the seat identity of the first ejection seat and the ejection mode.

In various embodiments, the escape path clearance subsystem includes a first clearance assembly configured to at least one of remove or weaken a first portion of an aircraft canopy and a second clearance assembly configured to at least one of remove or weaken a second portion of the aircraft canopy. The first sequencer is configured to determine whether to fire the first clearance assembly, the second clearance assembly, or both the first clearance assembly and the second clearance assembly based on the seat location of the first ejection seat, the seat identity of the first ejection seat, and the ejection mode.

An ejection seat is also disclosed herein. In accordance with various embodiments, the ejection seat may comprise a first sequencer, a primary power source connected to the first sequencer, and a first seat auxiliary power source connected to the first sequencer. The ejection further comprises a first ejection seat subsystem in communication with the first sequencer, and a tangible, non-transitory computer-readable storage medium having instructions stored thereon. The instructions, in response to execution by the first sequencer, cause the first sequencer to perform operations, which may comprise receiving, by the first sequencer, a power input from at one of the primary power source or the first seat auxiliary power source; determining, by the first sequencer, a location of the ejection seat and an identity of the ejection seat; determining, by the first sequencer, an ejection mode; determining, by the first sequencer, a deployment sequence for a seat rocket catapult subsystem and the first ejection seat subsystem of the ejection seat based on the location of the ejection seat, the identity of the ejection seat, and the ejection mode; sending, by the first sequencer, a first deploy command to an escape path clearance subsystem; sending, by the first sequencer, a second deploy command the seat rocket catapult subsystem; and sending, by the first sequencer, a third deploy command to the first ejection seat subsystem.

In various embodiments, the operations further comprise receiving, by the first sequencer, an output from an ejection mode selector; determining, by the first sequencer, the ejection mode based on the output from the ejection mode selector; and determining, by the first sequencer, whether to power-on a second sequencer located in a second ejection seat based on the identity of the ejection seat and the ejection mode.

In various embodiments, the operations further comprise determining, by the first sequencer, whether a first connector has disconnected from a second connector; and sending, by the first sequencer, the second deploy command to the seat rocket catapult subsystem in response to determining the first connector has disconnected from the second connector. A first wire bundle is connected between the first connector and the escape path clearance subsystem, and a second wire bundle is connected between the second connector and the first sequencer In various embodiments, the operations further comprise determining, by the first sequencer, a time delay for sending the second deploy command to the seat rocket catapult subsystem. The time delay may be determined based on the location of the ejection seat, the identity of the ejection seat, and the ejection mode.

In various embodiments, the operations further comprise determining, by the first sequencer, whether to fire a first clearance assembly of the escape path clearance subsystem, a second clearance assembly of the escape path clearance subsystem, or both the first clearance assembly and the second clearance assembly, based on the location of the ejection seat, the identity of the ejection seat, and the ejection mode. The first clearance assembly is configured to remove a first portion of an aircraft canopy, and the second clearance assembly is configured to remove a second portion of the aircraft canopy.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Figure 1:
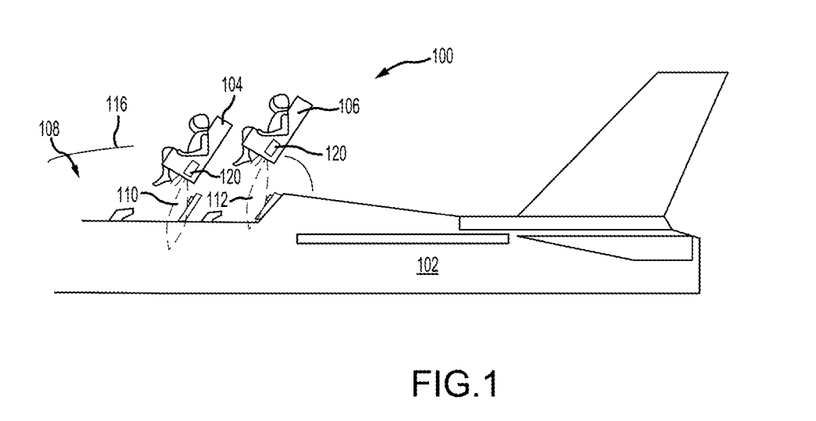
FIG. 1 illustrates ejection seats being launched from an aircraft cockpit, in accordance with various embodiments.

Referring now to FIG. 1, a multi-seat ejection system 100 is shown, in accordance with various embodiments. Multi-seat ejection system 100 may be installed in aircraft 102 to safely expel a pilot (or first) ejection seat 104 and a co-pilot (or second) ejection seat 106 from the cockpit 108 of aircraft 102. First ejection seat 104 may be urged from cockpit 108 by a propulsion system 110. Second ejection seat 106 may be urged from cockpit 108 by a propulsion system 112. Aircraft 102 may be a passenger aircraft, a cargo aircraft, a military aircraft, or the like. As described in further detail below, each of first ejection seat 104 and second ejection seat 106 includes an escape system and ejection seat (ESES) sequencer 120. Each ESES sequencer 120 is configured to control the deployment sequence (i.e., timing) of the of aircraft escape subsystems and the ejection seat subsystems of multi-seat ejection system 100. While multi-seat ejection system 100 is shown as including two ejection seats 104, 106, with first ejection seat 104 located forward of second ejection seat 106, it is contemplated and understood that multi-seat ejection system 100 can be extended to more than two ejection seats and/or to ejections seats in other locations (e.g., starboard, port, etc.) as needed and based on the configuration of aircraft 102.

The aircraft escape subsystems may include an escape path clearance subsystem associated with clearing canopy 116 from over ejection seats 104, 106 and a propulsion subsystem (e.g., a rocket catapult subsystem) associated with the expulsion of the respective ejection seat 104, 106 from cockpit 108. Each of the ejection seats 104, 106 includes its own set of ejection seat subsystems, which are located on the ejection seat 104, 106 and are generally associated with controlling the ejection seat 104, 106 during expulsion from the cockpit 108, separating the occupant from his/her respective ejection seat 104, 106, and/or deploying a main parachute configured to safely convey the seat occupant to the ground.

Figure 2A:
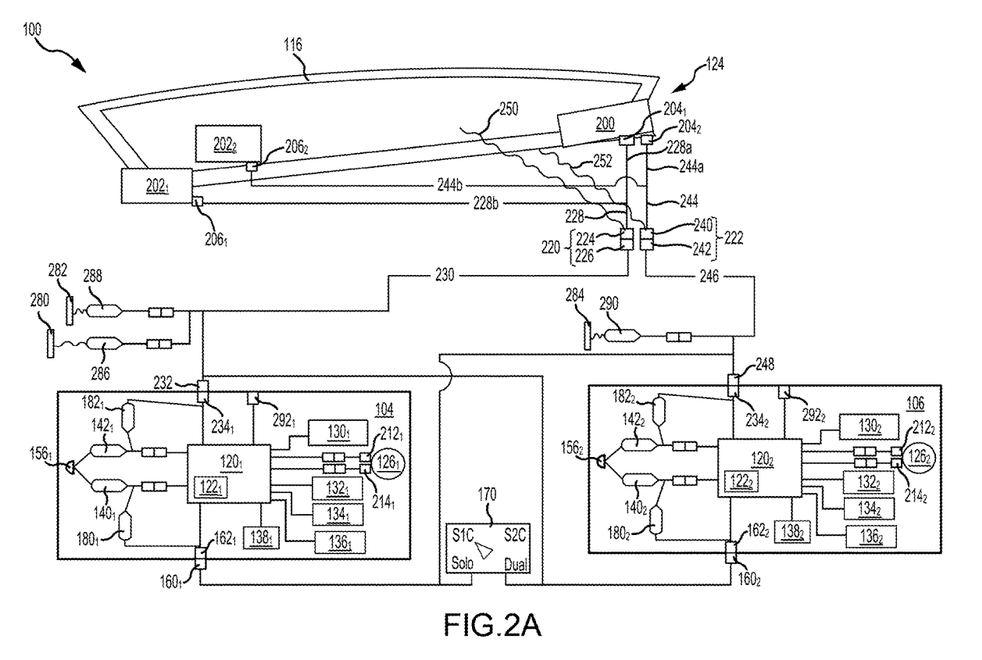
FIG. 2A illustrates a schematic of a multi-seat ejection system, in accordance with various embodiments.

With additional reference to FIG. 2A, a schematic of multi-seat ejection system 100 is illustrated. In accordance with various embodiments, multi-seat ejection system 100 includes first (or pilot) ESES sequencer $120_1$ and second (or co-pilot) ESES sequencer $120_2$. First ESES sequencer $120_1$ may be located on first ejection seat 104. Second ESES sequencer $120_2$ may be located on second ejection seat 106. In various embodiments, first ESES sequencer $120_1$ and second ESES sequencer $120_2$ may be "universal" sequencers. Stated differently, first ESES sequencer $120_1$ may be identical to second ESES sequencer $120_2$. In this regard, first ESES sequencer $120_1$ and second ESES sequencer $120_2$ may be programmed with the specific timing sequences for multiple models of ejection seats located in a variety of locations (e.g. forward, aft, starboard, port, etc.) in multiple models of aircraft. As described in further detail below, first ESES sequencer $120_1$ and second ESES sequencer $120_2$ are configured to identify the ejection seat location (e.g., forward, aft, port, starboard, etc.) based on a connection to a wire harness having a unique pin configuration. First ESES sequencer $120_1$ and second ESES sequencer $120_2$ then implement seat specific timing instructions based on the identified ejection seat location. Employing the same (i.e., universal) part for both first ESES sequencer $120_1$ and second ESES sequencer $120_2$ can reduce the number of unique parts associated with multi-seat ejection system 100, which tends to reduce costs.

Each of first and second ESES sequencers $120_1$, $120_2$ may include one or more logic devices such as one or more of a microcontroller unit (MCU) with embedded firmware, a central processing unit (CPU), an accelerated processing unit (APU), a digital signal processor (DSP), a field programmable gate array (FPGA), an application specific integrated circuit (ASIC), or the like. First ESES sequencer $120_1$ includes and communicates with a first tangible, non-transitory computer-readable storage medium $122_1$. Second ESES sequencer $120_2$ includes and communicates with a second tangible, non-transitory computer-readable storage medium $122_2$. First and second storage mediums $122_1$, $122_2$ may be any tangible, non-transitory computer-readable storage medium known in the art. Each storage medium $122_1$, $122_2$ has instructions stored thereon for controlling the deployment of the aircraft escape subsystems and ejection seat subsystems of multi-seat ejection system 100. The instructions, in response to execution by the respective ESES sequencer $120_1$, $120_2$, cause the ESES sequencer $120_1$, $120_2$ to perform various operations related to the deployment of the aircraft escape subsystems and the ejection seat subsystems.

Figure 2B:
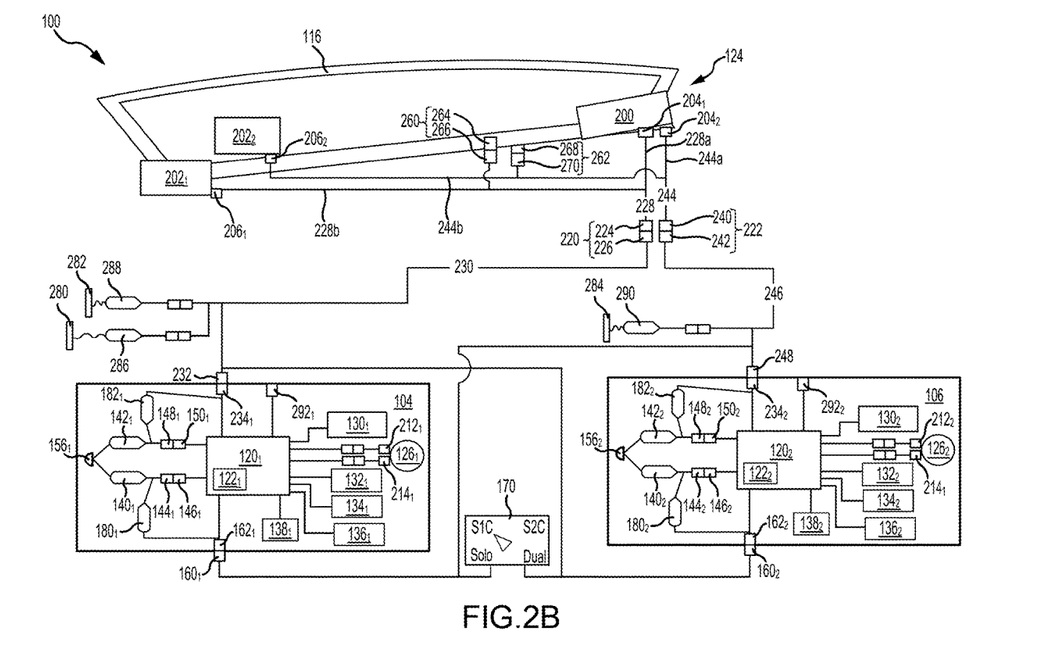
FIG. 2B illustrates a schematic of a multi-seat ejection system having an escape path clearance subsystem that includes canopy disconnects, in accordance with various embodiments.
Figure 2C:
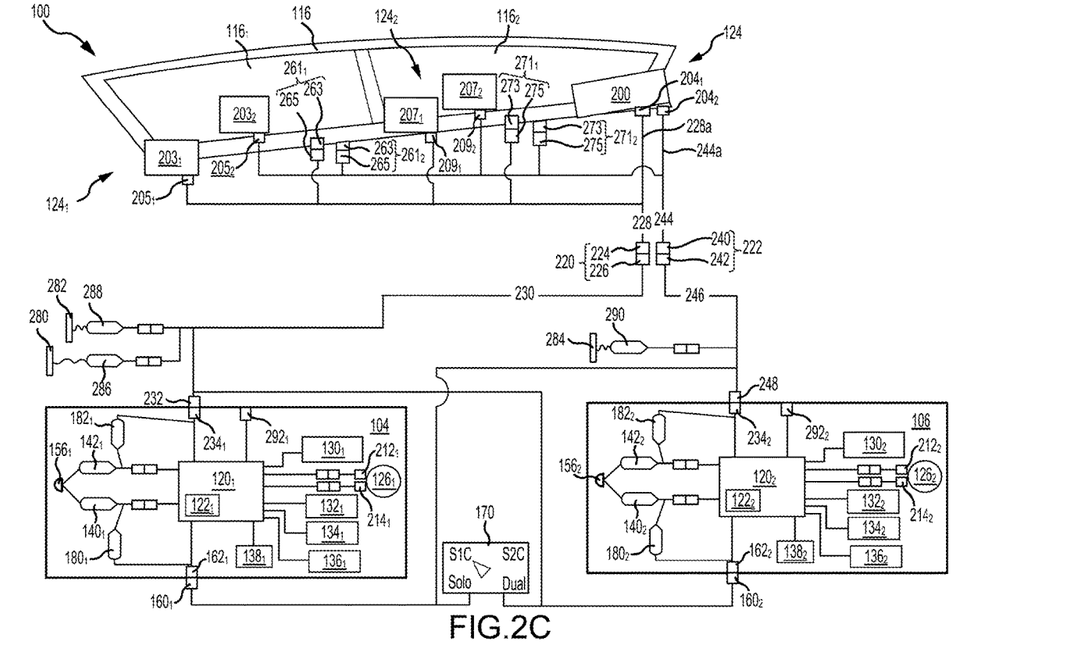
FIG. 2C illustrates a schematic of a multi-seat ejection system having an escape path clearance subsystem that includes a forward clearance assembly and aft clearance assembly, in accordance with various embodiments.
Figure 3:
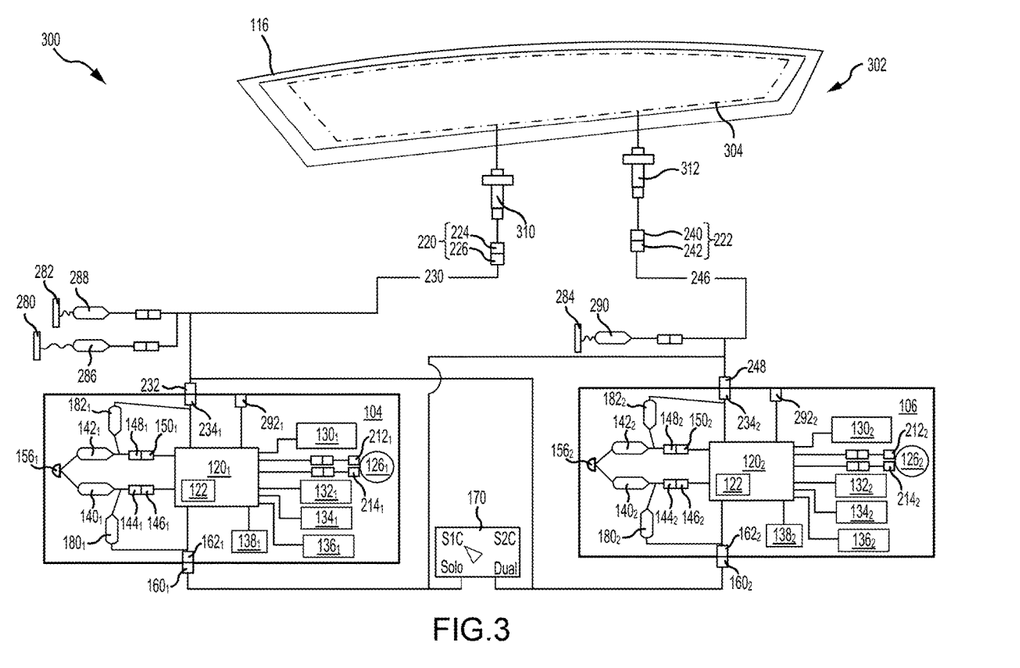
FIG. 3 illustrates a schematic of a multi-seat ejection system having an escape path clearance subsystem that includes a canopy breaking assembly, in accordance with various embodiments.

In accordance with various embodiments, the aircraft escape subsystems include an escape path clearance subsystem 124 configured to remove canopy 116 from over first ejection seat 104 and/or from over second ejection seat 106, a first seat rocket catapult subsystem $126_1$ configured to expel first ejection seat 104 from the aircraft cockpit 108 (FIG. 1), and a second seat rocket catapult subsystem $126_2$ configured to expel second ejection seat 106 from the aircraft cockpit 108 (FIG. 1). While FIGS. 2A, 2B, and 2C illustrate escape path clearance subsystem 124 as a canopy jettison system and FIG. 3A illustrates an escape path clearance subsystem 302 as a canopy fracture system, it is contemplated and understood that the ejection systems, sequencers, and methods disclosed herein may work with any type of escape path clearance subsystem including, but not limited to, canopy/hatch jettison, canopy/hatch fragilization, canopy/hatch fracture, canopy/hatch severance, and/or combinations thereof. Similarly, the ejection systems, sequencers, and methods disclosed herein may work with escape path clearance subsystems configured to remove or weaken the canopy/hatch as a single unit and escape path clearance subsystems configured to remove or weaken portions of canopy/hatch separately from one another (e.g., escape path clearance subsystems where the portion of the canopy/hatch located over first ejection seat 104 is removed or weakened separately from the portion of canopy/hatch located over second ejection seat 106).

In accordance with various embodiments, the ejection seat subsystems of first ejection seat 104 may include, for example, a first main parachute subsystem $130_1$, a first drogue parachute subsystem $132_1$, a first restraint release subsystem $134_1$, a first pitch stabilization package (STAPAC) subsystem $136_1$, and/or a first inertia reel subsystem $138_1$. In accordance with various embodiments, the ejection seat subsystems of second ejection seat 106 may include, for example, a second main parachute subsystem $130_2$, a second drogue parachute subsystem $132_2$, a second restraint release subsystem $134_2$, a second STAPAC subsystem $136_2$, and/or a second inertia reel subsystem $138_2$. It is contemplated and understood that the foregoing ejection seat subsystems are exemplary and that first ejection seat 104 and second ejection seat 106 may include any combination of the above disclosed ejection seat subsystems and/or additional ejection seat subsystems.

In accordance with various embodiments, multi-seat ejection system 100 includes a first seat primary power source $140_1$ and a first seat secondary power source $142_1$. Each of first seat primary power source $140_1$ and first seat secondary power source $142_1$ are operably (e.g., electrically) coupled to first ESES sequencer $120_1$ and are configured to provide power to first ESES sequencer $120_1$. First seat secondary power source $142_1$ may provide a redundancy to first seat primary power source $140_1$. In this regard, should one of first seat primary power source $140_1$ or first seat secondary power source $142_1$ fail, the other of first seat primary power source $140_1$ and first seat secondary power source $142_1$ outputs power to first ESES sequencer $120_1$.

In accordance with various embodiments, first seat primary power source $140_1$ and first seat secondary power source $142_1$ are configured to activate in response to initiation of an ejection sequence from first ejection seat 104. For example, first seat primary power source $140_1$ and first seat secondary power source $142_1$ may be activated in response to actuation of a first seat handle $156_1$ of multi-seat ejection system 100. First seat handle $156_1$ may be located on first ejection seat 104 such that first seat handle $156_1$ can be actuated (e.g., pulled) by an occupant of first ejection seat 104. Actuation of first seat handle $156_1$ is configured to initiate ejection of, at least, first ejection seat 104 and possibly an ejection of second ejection seat 106, depending on the selected ejection mode, as described in further detail below.

Upon activation, first seat primary power source $140_1$ and first seat secondary power source $142_1$ output power (e.g., current) to first ESES sequencer $120_1$. Stated differently, upon actuation of first seat handle $156_1$, first ESES sequencer $120_1$ receives a power input from first seat primary power source $140_1$ and/or from first seat secondary power source $142_1$. In various embodiments, first seat primary power source $140_1$ and first seat secondary power source $142_1$ may each comprise a thermal battery configured to activate in response to an ejection sequence being initiated by the occupant of first ejection seat 104 (e.g., in response to actuation of first seat handle $156_1$). For example, actuation of first seat handle $156_1$ may cause a chemical reaction within the thermal battery. The chemical reaction generates electricity that is provided to first ESES sequencer $120_1$. While first seat primary power source $140_1$ and first seat secondary power source $142_1$ are described as thermal batteries, it is contemplated and understood that any suitable power source may be employed to provide power to first ESES sequencer $120_1$.

Multi-seat ejection system 100 also includes a second seat primary power source $140_2$ and a second seat secondary power source $142_2$. Each of second seat primary power source $140_2$ and second seat secondary power source $142_2$ are operably (e.g., electrically) coupled to second ESES sequencer $120_2$ and are configured to provide power to second ESES sequencer $120_2$. Second seat primary power source $140_2$ and second seat secondary power source $142_2$ may be similar, respectively, to first seat primary power source $140_1$ and first seat secondary power source $142_1$, as described above.

In accordance with various embodiments, second seat primary power source $140_2$ and second seat secondary power source $142_2$ are configured to activate in response to an ejection sequence being initiated from second ejection seat 106. For example, second seat primary power source $140_2$ and second seat secondary power source $142_2$ may be activated in response to actuation of second seat handle $156_2$. Second seat handle $156_2$ may be located on second ejection seat 106 such that second seat handle $156_2$ can be actuated (e.g., pulled) by an occupant of second ejection seat 106. Actuation of second seat handle $156_2$ is configured to initiate ejection of, at least, second ejection seat 106 and possibly an ejection of first ejection seat 104, depending on the selected ejection mode, described in further detail below.

In accordance with various embodiments, in response to receiving a power input from first seat primary power source $140_1$ and/or first seat secondary power source $142_1$, first ESES sequencer $120_1$ determines a location (e.g., forward, aft, port, starboard, etc.) of first ejection seat 104 and an identity of first ejection seat 104 (e.g. seat 1, seat 2, pilot, co-pilot, master, slave, etc.). First ESES sequencer $120_1$ determines the location and the identity of first ejection seat 104 based on a unique pin configuration of a connector $160_1$. Connector $160_1$ engages a connector $162_1$ that is connected to first ESES sequencer $120_1$. Connector $162_1$ may be located on first ejection seat 104. In accordance with various embodiments, connector $160_1$ is connected to an ejection mode selector 170 of multi-seat ejection system 100. In this regard, first ESES sequencer $120_1$ is in communication with mode selector 170 via the engagement (i.e., connection) of connector $160_1$ and connector $162_1$. As used herein, "communication" may refer to electrical communication (i.e., electrically coupled to) or any other suitable means of signal transfer (e.g., communication may be conducted via fiber optics).

In response to receiving a power input from second seat primary power source $140_2$ and/or second seat secondary power source $142_2$, second ESES sequencer $120_2$ determines a location (e.g., forward, aft, port, starboard, etc.) of second ejection seat 106 and an identity of second ejection seat 106 (e.g. seat 1, seat 2, pilot, co-pilot, master, slave, etc.). Second ESES sequencer $120_2$ determines the location and the identity of second ejection seat 106 based on a unique pin configuration of a connector $160_2$. Connector $160_2$ engages a connector $162_2$ that is connected to second ESES sequencer $120_2$. Connector $162_2$ may be located on second ejection seat 106. In accordance with various embodiments, connector $160_2$ is connected to ejection mode selector 170. In this regard, second ESES sequencer $120_2$ is in communication with mode selector 170 via the engagement (i.e., connection) of connector $160_2$ and connector $162_2$.

The pin configuration of connector $160_1$ is unique to the location and identity of the ejection seat to which the connector $160_1$ will be connected. The pin configuration of connector $160_2$ is unique to the location and identity of the ejection seat to which the connector $160_2$ will be connected. For example, a connector $160_1$ that will be connected to a forward, pilot seat has a first pin configuration. A connector $160_1$ that will be connected to an aft, copilot seat has a second pin that is different from the first pin configuration. Similarly, a connector $160_1$ that will be connected to a forward, copilot seat has a third pin configuration that is different from the first and second pin configurations, and a connector $160_1$ that will be connected to an aft, pilot seat has a fourth pin configuration that is different from the first, second, and third pin configurations.

In various embodiments, the unique pin configuration of connector $160_1$ may also convey the seat model of first ejection seat 104, the model of aircraft 102 in which first ejection seat 104 is installed, the model/type of escape path clearance subsystem 124, and/or any other information first ESES sequencer $120_1$ may use to make decisions about the timing sequence for deploying the aircraft escape subsystems and the ejection seat subsystems of first ejection seat 104. The unique pin configuration of connector $160_2$ may also convey the seat model of second ejection seat 106, the model of aircraft 102 in which second ejection seat 106 is installed, the model/type of escape path clearance subsystem 124, and/or any other information second ESES sequencer $120_2$ may employ to make decisions about the timing sequence for deploying the aircraft escape subsystems and the ejection seat subsystems of second ejection seat 106.

In accordance with various embodiments, first and second ESES sequencers $120_1$, $120_2$ also determine a current ejection mode for multi-seat ejection system 100 based on an output (e.g., an electrical signal) from ejection mode selector 170. Ejection mode selector 170 is configured to allow a crew member of aircraft 102 to manually select an ejection mode for multi-seat ejection system 100. In this regard, an output of ejection mode selector 170 is indicative of the current ejection mode for multi-seat ejection system 100. First ESES sequencer $120_1$ is configured to determine an ejection sequence for first ejection seat 104 based on the seat location determination, the seat identity determination, and the ejection mode determination. In accordance with various embodiments, the location and identity determinations are based on the unique configuration of connector $160_1$ and the ejection mode determination is based on an output from ejection mode selector 170. Second ESES sequencer $120_2$ is configured to determine an ejection sequence for second ejection seat 106 based on the seat location determination, the seat identity determination, and ejection mode determination. In accordance with various embodiments, the location and identity determinations are based on the unique configuration of connector $160_2$ and the ejection mode determination is based on an output from ejection mode selector 170.

In various embodiments, ejection mode selector 170 may be configured to allow the crew member(s) of aircraft 102 to select between, for example, a solo ejection mode, a dual ejection mode, a pilot (or seat 1) command ejection mode (S1C), and a co-pilot (or seat 2) command ejection mode (S2C). Ejection mode selector 170 may be a knob, push button(s), switch, touch screen, or any other component capable of allowing a crew member to select one of solo ejection mode, dual ejection mode, S1C ejection mode, and S2C ejection mode.

In accordance with various embodiments, solo ejection mode is configured such that initiation of an ejection sequence by first ejection seat 104 (e.g., actuation of first seat handle $156_1$) causes expulsion of only first ejection seat 104 and initiation of an ejection sequence by second ejection seat 106 (e.g., actuation of second seat handle $156_2$) causes expulsion of only second ejection seat 106. Stated differently, when solo ejection mode is selected, actuation of first seat handle $156_1$ does not cause second ejection seat 106 to deploy, and actuation of second seat handle $156_2$ does not cause first ejection seat 104 to deploy. Dual ejection mode is configured such that initiation of an ejection sequence by either first ejection seat 104 or second ejection seat 106 (e.g., actuation of either first seat handle $156_1$ or second seat handle $156_2$) causes expulsion of both first ejection seat 104 and second ejection seat 106.

S1C ejection mode is configured such that initiation of an ejection sequence by first ejection seat 104 (e.g., actuation of first seat handle $156_1$) causes expulsion of both first ejection seat 104 and second ejection seat 106, while initiation of an ejection sequence by second ejection seat 106 (e.g., actuation of second seat handle $156_2$) causes expulsion of only second ejection seat 106. In this regard, when S1C ejection mode is selected, actuation of second seat handle $156_2$ does not cause first ejection seat 104 to deploy.

S2C ejection mode is configured such that initiation of an ejection sequence by second ejection seat 106 (e.g., actuation of second seat handle $156_2$) causes expulsion of both first ejection seat 104 and second ejection seat 106, while initiation of an ejection sequence by first ejection seat 104 (e.g., actuation of first seat handle $156_1$) causes expulsion of only first ejection seat 104. In this regard, when S2C mode is selected, actuation of first seat handle $156_1$ does not cause second ejection seat 106 to deploy. A selection of S1C mode or S2C mode does not prohibit the non-initiating seat from ejecting itself after the initiating ejection seat has been expelled. For example, if S1C mode is selected and second ejection seat 106 initiates an initial ejection, first ejection seat 104 may still eject if first seat handle $156_1$ is pulled after second ejection seat 106 has been expelled.

First ESES sequencer $120_1$ may determine which ejection sequence of a plurality of ejection sequences stored within storage medium $122_1$ to employ based on the location of first ejection seat 104, the identity of first ejection seat 104, and the current ejection mode. Stated differently, first ESES sequencer $120_1$ may determine a firing sequence for the aircraft escape subsystems (e.g., escape path clearance subsystem 124 and/or first seat rocket catapult subsystem $126_1$) and the ejection seat subsystems of first ejection seat 104

(e.g., first main parachute subsystem $130_1$, first drogue parachute subsystem $132_1$, first restraint release subsystem $134_1$, first STAPAC subsystem $136_1$, and/or first inertia reel subsystem $138_1$) based on the location of first ejection seat 104, the identity of first ejection seat 104, and the ejection mode.

Second ESES sequencer $120_2$ may determine which ejection sequence of a plurality of ejection sequences stored within storage medium $122_2$ to employ based on the location of second ejection seat 106, the identity of second ejection seat 106, and the current ejection mode. Stated differently, second ESES sequencer $120_2$ may determine a firing sequence for the aircraft escape subsystems (e.g., escape path clearance subsystem 124 and/or second seat rocket catapult subsystem $126_2$) and the ejection seat subsystems of second ejection seat 106 (e.g., second main parachute subsystem $130_2$, second drogue parachute subsystem $132_2$, second restraint release subsystem $134_2$, second STAPAC subsystem $136_2$, and/or second inertia reel subsystem $138_2$) based on the location of second ejection seat 106, the identity of second ejection seat 106, and the ejection mode.

In accordance with various embodiments, first and second ESES sequencers $120_1$, $120_2$ are configured to control the deployment of escape path clearance subsystem 124. In various embodiments, escape path clearance subsystem 124 is a canopy jettison system comprising a canopy unlock thruster 200 configured to unlock canopy 116 and one or more canopy jettison rockets, such as, for example, first canopy jettison rocket $202_1$ and second canopy jettison rocket $202_2$. First canopy jettison rocket $202_1$ and second canopy jettison rocket $202_2$ are configured to propel canopy 116 away from the cockpit 108 (FIG. 1).

In accordance with various embodiments, first and second ESES sequencers $120_1$, $120_2$ control the deployment of canopy unlock thruster 200 by outputting deploy commands to electronic-explosive devices (EEDs), such first thruster EED $204_1$ and second thruster EED $204_2$, operably connected to canopy unlock thruster 200. Second thruster EED $204_2$ may provide a redundancy to first thruster EED $204_1$. First and second ESES sequencers $120_1$, $120_2$ control the deployment of first canopy jettison rocket $202_1$ and second canopy jettison rocket $202_2$ by outputting deploy commands to a first jettison EED $206_1$ operably connected to first canopy jettison rocket $202_1$ and to a second jettison EED $206_2$ operably connected to second canopy jettison rocket $202_2$. Second jettison EED $206_2$ and second canopy jettison rocket $202_2$ may provide a redundancy to first jettison EED $206_1$ and first canopy jettison rocket $202_1$, respectively.

First thruster EED $204_1$, second thruster EED $204_2$, first jettison EED $206_1$, and second jettison EED $206_2$ are each configured to fire (e.g., ignite a propellant in the energy chain of the EED) in response to receiving a deploy command from first ESES sequencer $120_1$ and/or from second ESES sequencer $120_2$. Canopy unlock thruster 200 unlocks canopy 116, in response to the firing of first thruster EED $204_1$ and/or second thruster EED $204_2$. For example, canopy unlock thruster 200 may translate canopy 116 in a forward or aft direction such that hooks attached to canopy 116 are located clear of tabs connected to the aircraft 102 (i.e., such that the canopy hooks are aligned with openings between the tabs), thereby unlocking canopy 116 from the aircraft 102. In response to first and second jettison EEDs $206_1$, $206_2$ firing, first and second canopy jettison rockets $202_1$, $202_2$ fire, respectively, thereby expelling canopy 116 from over first and second ejection seats 104, 106.

In accordance with various embodiments, first and second ESES sequencers $120_1$, $120_2$ are configured to control the sequence in which first and second thruster EEDs $204_1$, $204_2$ and first and second jettison EEDs $206_1$, $206_2$ fire such that canopy unlock thruster 200 will deploy and unlock canopy 116 prior to first and second canopy jettison rockets $202_1$, $202_2$ firing. For example, first and second ESES sequencers $120_1$, $120_2$ may send deploy commands to first and second jettison EEDs $206_1$, $206_2$ a preset time delay after sending deploy commands to first and second thruster EEDs $204_1$, $204_2$.

In accordance with various embodiments, first ESES sequencer $120_1$ also controls the expulsion of first ejection seat 104 from cockpit 108 by controlling when first seat rocket catapult subsystem $126_1$ fires (i.e., deploys). First seat rocket catapult subsystem $126_1$ may include propulsion system 110 in FIG. 1. In various embodiments, first ESES sequencer $120_1$ fires first seat rocket catapult subsystem $126_1$ by outputting a deploy command (e.g., an electrical signal) to one or more EED(s), such as first rocket EED $212_1$ and second rocket EED $214_1$. First and second rocket EEDs $212_1$, $214_1$ are operably coupled to first seat rocket catapult subsystem $126_1$. First and second rocket EEDs $212_1$, $214_1$ are configured to fire (e.g., a propellant in the energy chain of the rocket EED $212_1$, $214_1$ ignites) in response to receiving the deploy command from first ESES sequencer $120_1$. In response to first and/or second rocket EED(s) $212_1$, $214_1$ firing, first seat rocket catapult subsystem $126_1$ deploys, thereby expelling first ejection seat 104 from the cockpit 108 (FIG. 1). In accordance with various embodiments, first ESES sequencer $120_1$ is configured to control the sequence in which jettison EEDs $206_1$, $206_2$ of escape path clearance subsystem 124 and rocket EEDs $212_1$, $214_1$ of first seat rocket catapult subsystem $126_1$ fire, so that first and second canopy jettison rockets $202_1$, $202_2$ fire prior to first seat rocket catapult subsystem $126_1$.

In accordance with various embodiments, second ESES sequencer $120_2$ controls the expulsion of second ejection seat 106 from cockpit 108 by controlling when second seat rocket catapult subsystem $126_2$ fires (i.e., deploys). Second seat rocket catapult subsystem $126_2$ may include propulsion system 112 in FIG. 1. In various embodiments, second ESES sequencer $120_2$ fires second seat rocket catapult subsystem $126_2$ by outputting a deploy command (e.g., an electrical signal) to one or more EED(s), such as first rocket EED $212_2$ and second rocket EED $214_2$. First and second rocket EED $212_2$, $214_2$ are operably coupled to second seat rocket catapult subsystem $126_2$. First and second rocket EEDs $212_2$, $214_2$ are configured to fire (e.g., a propellant in the energy chain of the rocket EED ignites) in response to receiving the deploy command from second ESES sequencer $120_2$. In response to first and/or second rocket EED(s) $212_2$, $214_2$ firing, second seat rocket catapult subsystem $126_2$ deploys, thereby expelling second ejection seat 106 from the cockpit 108 (FIG. 1). In accordance with various embodiments, second ESES sequencer $120_2$ is configured to control the sequence in which jettison EEDs $206_1$, $206_2$ of escape path clearance subsystem 124 and rocket EEDs $212_2$, $214_2$ of second seat rocket catapult subsystem $126_2$ fire, so that first and second canopy jettison rockets $202_1$, $202_2$ fire prior to second seat rocket catapult subsystem $126_2$.

In accordance with various embodiments, the timing for firing rocket EEDs $212_1$, $214_1$ of first seat rocket catapult subsystem $126_1$ and rocket EEDs $212_2$, $214_2$ of second seat rocket catapult subsystem $126_2$ is also based on the seat location, seat identity, and ejection mode determinations. In this regard, if both first ejection seat 104 and second ejection seat 106 are going to be expelled the timing of the deploy commands sent to rocket EEDs $212_1$, $214_1$ and rocket EEDs $212_2$, $214_2$ is configured to cause second seat rocket catapult subsystem $126_2$ to fire prior to first seat rocket catapult subsystem $126_1$. In other words, the timing sequences implemented by first and second ESES sequencers $120_1$, $120_2$ are configured to cause second ejection seat 106 to be expelled prior to first ejection seat 104.

In various embodiments, one or more disconnects, such as disconnect 220 and disconnect 222, are coupled between escape path clearance subsystem 124 and first and second ESES sequencers $120_1$, $120_2$. Disconnect 220 is formed by a connector 224 and a connector 226. Connector 224 is connected to a wire bundle 228. Stated differently, wire bundle 228 includes connector 224. A first set of wires 228a of wire bundle 228 is connected to first thruster EED $204_1$. A second set of wires 228b of wire bundle 228 is connected to first jettison EED $206_1$. Connector 226 is connected to a wire bundle 230. Stated differently, wire bundle 230 includes connectors 226. Connector 224 is configured to engage connector 226, thereby coupling one or more wires of wire bundle 228 to one or more wires of wire bundle 230. Wire bundle 230 also includes a connector 232. Connector 232 is configured to engage a connector 2341 that is connected to first ESES sequencer $120_1$. In this regard, wire bundle 230 may be connected to first ESES sequencer $120_1$ by engaging connector 232 with connector 2341. Connector 2341 may be located on first ejection seat 104. The connection of first ESES sequencer $120_1$ to wire bundle 230, via engagement of connector 232 with connector 2341, along with the connection to wire bundle 228, via engagement of connector 224 with connector 226, allows first ESES sequencer $120_1$ to send deploy commands to first thruster EED $204_1$ and first jettison EED $206_1$.

In various embodiments, one or more wires of wire bundle 230 is/are connected to connector $160_2$, thereby connecting wire bundle 230 to second ESES sequencer $120_2$. The connection of second ESES sequencer $120_2$ to wire bundle 230, via engagement of connector $160_2$ with connector $162_2$, along with the connection to wire bundle 228, via engagement of connector 226 with connector 224, allows second ESES sequencer $120_2$ to send deploy commands (e.g. electrical signals) to first thruster EED $204_1$, and first jettison EED $206_1$.

Disconnect 222 is formed by a connector 240 and a connector 242. Connector 240 is connected to a wire bundle 244. Stated differently, wire bundle 244 includes connector 2240. A first set of wires 244a of wire bundle 244 is connected to second thruster EED $204_2$. A second set of wires 244b of wire bundle 244 is connected to second jettison EED $206_2$. Connector 242 is connected to a wire bundle 246. Stated differently, wire bundle 246 includes connector 242. Connector 240 is configured to engage connector 242, thereby coupling one or more wires of wire bundle 244 to one or more wires of wire bundle 246. Wire bundle 246 also includes a connector 248. Connector 248 is configured to engage a connector $234_2$ that is connected to second ESES sequencer $120_2$. In this regard, wire bundle 246 may be connected to second ESES sequencer $120_2$ by engaging connector 248 with connector $234_2$. Connector $234_2$ may be located on second ejection seat 106. The connection of second ESES sequencer $120_2$ to wire bundle 246, via engagement of connector 248 with connector $234_2$, along with the connection to wire bundle 244, via engagement of connector 240 with connector 242, allows second ESES sequencer $120_2$ to send deploy commands to second thruster EED $204_2$ and second jettison EED $206_2$.

In various embodiments, one or more wires of wire bundle 246 is/are connected to connector $160_1$, thereby connecting wire bundle 246 to first ESES sequencer $120_1$. The connection of first ESES sequencer $120_1$ to wire bundle 246, via engagement of connector $160_1$ with connector $162_1$, along with the connection to wire bundle 244, via engagement of connector 240 with connector 242, allows first ESES sequencer $120_1$ to send deploy commands (e.g. electrical signals) to second thruster EED $204_2$, and second jettison EED $206_2$.

In various embodiments, a first lanyard 250 may be connected between canopy 116 and connector 224. A second lanyard 252 may be connected between canopy 116 and connector 240. First lanyard 250 is configured to disconnect connector 224 from connector 226, in response to removal of canopy 116 from over first and second ejection seats 104, 106. Similarly, second lanyard 252 is configured to disconnect connector 240 from connector 242, in response to removal of canopy 116 from over first and second ejection seats 104, 106. For example, the length of first and second lanyards 250, 252 and/or the connection location of first and second lanyards 250, 252 on canopy 116 is/are selected such that first and second lanyards 250, 252 will translate (e.g., pull) connectors 224, 240 away from connectors 226, 242, respectively, in response to canopy 116 translating a threshold distance away from the cockpit 108 and/or in response to canopy 116 translating beyond a threshold angle.

In accordance with various embodiments, disconnects 220, 222 are configured such that first ESES sequencer $120_1$ and second ESES sequencer $120_2$ can determine when connectors 224, 240 have disconnected from connectors 226, 242. In accordance with various embodiments, first ESES sequencer $120_1$ and second ESES sequencer $120_2$ are configured to send the deploy commands to first seat rocket catapult subsystem $126_1$ and second seat rocket catapult subsystem $126_2$, respectively, after determining that connector 224 is disconnected from connector 226 (i.e., in response to first lanyard 250 disconnecting connector 224 from connector 226) and/or that connector 240 is disconnected from connector 242 (i.e., in response to second lanyard 252 disconnecting connector 240 from connector 242). In this regard, first ESES sequencer $120_1$ sends fire commands to first rocket EED $212_1$ and second rocket EED $214_1$ in response to determining that connector 224 is disconnected from connector 226 and/or that connector 240 is disconnected from connector 242. Second ESES sequencer $120_2$ sends fire commands to first rocket EED $212_2$ and second rocket EED $214_2$ in response to determining that connector 224 is disconnected from connector 226 and/or that connector 240 is disconnected from connector 242.

First ESES sequencer $120_1$ may determine when to send the fire commands to rocket EED $212_1$ and rocket EED $214_1$ based on the seat location, seat identity, and ejection mode determinations made by first ESES sequencer $120_1$. For example, if first ESES sequencer $120_1$ determines the location of first ejection seat 104 is a forward seat and the identity of first ejection seat 104 is seat 1 (e.g., pilot seat), and that either dual ejection mode or S1C ejection mode is selected, then first ESES sequencer $120_1$ may send the fire command to rocket EED $212_1$ and rocket EED $214_1$ a first time delay (e.g., a first number of milliseconds) after determining the canopy 116 has jettisoned (i.e., in response to determining that connectors 224, 240 has/have disconnected from connectors 226, 242). The first time delay may be configured such that first seat rocket catapult subsystem $126_1$ fires after second seat rocket catapult subsystem $126_2$. In other words, in response to determining that both first and second ejection seats 104, 106 are going be ejected, first ESES sequencer $120_1$ implements a timing sequence configured to cause first ejection seat 104 to eject after second ejection seat 106.

In response to first ESES sequencer $120_1$ determining the location of first ejection seat 104 is a forward seat, the identity of first ejection seat 104 is seat 1, and that either solo ejection mode or S2C ejection mode is selected, first ESES sequencer $120_1$ sends the fire commands to rocket EED $212_1$ and rocket EED $214_1$ immediately upon determining that connectors 224, 240 have disconnected from connectors 226, 242. Stated differently, if first ESES sequencer $120_1$ determines only first ejection seat 104 is ejecting, then first ESES sequencer $120_1$ sends the fire commands to first rocket EED $212_1$ and second rocket EED $214_1$ a second delay time, which is shorter than the first time delay, after determining the canopy 116 has jettisoned (i.e., after determining connectors 224, 240 have disconnected from connectors 226, 242). Similarly, in response to determining the seat location is aft seat, second ESES sequencer $120_2$ implements a timing sequence where fire commands will be sent to first rocket EED $212_2$ and second rocket EED $214_2$ immediately upon second ESES sequencer $120_2$ determining that canopy 116 has jettisoned.

With momentary reference to FIG. 2B, in various embodiments, escape path clearance subsystem 124 may include one or more canopy disconnects, such as canopy disconnect 260 and canopy disconnect 262, located between canopy 116 and first and second ESES sequencers $120_1$, $120_2$. Canopy disconnect 262 may provide a redundancy to canopy disconnect 260. In various embodiments, canopy disconnect 260 may be connected (e.g., electrically coupled) to wire bundle 228, and canopy disconnect 262 may be connected (e.g., electrically coupled) to wire bundle 244. For example, canopy disconnect 260 may be located between canopy 116 and disconnect 220, and canopy disconnect 262 may be located between canopy 116 and disconnect 222.

Canopy disconnect 260 includes a first portion 264 and a second portion 266. Canopy disconnect 262 includes a first portion 268 and a second portion 270. First portions 264, 268 are configured to disconnect from second portions 266, 270, respectively, in response to removal of canopy 116 from over first and second ejection seats 104, 106. For example, first portions 264, 268 disconnect from second portions 266, 270, respectively, in response to canopy 116 translating a threshold distance away from the cockpit 108 and/or in response to canopy 116 translating beyond a threshold angle.

In accordance with various embodiments, canopy disconnects 260, 262 are configured such that first and second ESES sequencers $120_1$, $120_2$ can determine when first portions 264, 268 are disconnected from second portions 266, 270, respectively. In accordance with various embodiments, first ESES sequencer $120_1$ may be configured to send the deploy command to first seat rocket catapult subsystem $126_1$, in response to determining that first portion 264 has disconnected from second portion 266 and/or that first portion 268 has disconnected from second portion 270. Second ESES sequencer $120_2$ may be configured to send the deploy command to second seat rocket catapult subsystem $126_2$, in response to determining that first portion 264 has disconnected from second portion 266 and/or that first portion 268 has disconnected from second portion 270.

In various embodiments, the escape path clearance subsystem 124 may include a single clearance assembly configured to remove canopy 116 from over both first and second ejection seats 104, 106. In such embodiments, first and second ESES sequencers $120_1$, $120_2$ may be configured to fire the escape path clearance subsystem 124 immediately upon receiving power. In other words, the command to fire escape path clearance subsystem 124 may be sent prior to and/or independently of the seat location, seat identity, and ejection mode determinations.

With momentary reference to FIG. 2C, in various embodiments, escape path clearance subsystem 124 may include a first clearance assembly $124_1$ and second clearance assembly $124_2$. First clearance assembly $124_1$ is configured to remove a first portion $116_1$ of the canopy 116 from over first ejection seat 104. Second clearance assembly $124_2$ is configured to remove a second portion $116_2$ of the canopy 116 from over second ejection seat 106. In such embodiments, first ESES sequencer $120_1$ may determine whether to send the deploy command(s) to either the first clearance assembly $124_1$, the second clearance assembly $124_2$, or both the first clearance assembly $124_1$ and the second clearance assembly $124_2$ based on the seat location, seat identity, and ejection mode determinations. For example, in response to determining that only first ejection seat 104 is going to be expelled, first ESES sequencer $120_1$ commands first clearance assembly $124_1$ to fire, without firing second clearance assembly $124_2$ (e.g., without sending a fire command to second clearance assembly $124_2$). In response to determining that both first ejection seat 104 and second ejection seat 106 will be expelled, first ESES sequencer $120_1$ commands first clearance assembly $124_1$ and second clearance assembly $124_2$ to fire. Similarly, in response to determining that only second ejection seat 106 is going to be expelled, second ESES sequencer $120_2$ commands second clearance assembly $124_2$ to fire, without firing first clearance assembly $124_1$ (e.g., without sending a fire command to first clearance assembly $124_1$). In response to determining that both first ejection seat 104 and second ejection seat 106 will be expelled, second ESES sequencer $120_2$ commands first clearance assembly $124_1$ and second clearance assembly $124_2$ to fire.

First clearance assembly $124_1$ may include forward canopy jettison rockets $203_1$, $203_2$ and forward jettison EEDs $205_1$, $205_2$. Forward canopy jettison rockets $203_1$, $203_2$ are configured to propel the first portion $116_1$ of canopy 116 away from the cockpit 108 (FIG. 1). Forward jettison EEDs $205_1$, $205_2$ are configured to fire (e.g., ignite a propellant in the energy chain of the EED) in response to receiving a deploy command from first ESES sequencer $120_1$ and/or second ESES sequencer $120_2$. Forward canopy jettison rockets $203_1$, $203_2$ are operably coupled to forward jettison EEDs $205_1$, $205_2$, such that forward canopy jettison rockets $203_1$, $203_2$ fire in response to forward jettison EEDs $205_1$, $205_2$ firing, and thereby expel first portion $116_1$ of canopy 116 from over first ejection seat 104. Forward canopy jettison rocket $203_1$ and forward jettison EED $205_1$ may be connected to wire bundle 228. Forward canopy jettison rocket $203_2$ and forward jettison EED $205_2$ may be connected between to wire bundle 244. Forward canopy jettison rocket $203_2$ and forward jettison EED $205_2$ provide a redundancy for forward canopy jettison rocket $203_1$ and forward jettison EED $205_1$, respectively.

First clearance assembly $124_1$ may include forward canopy disconnects $261_1$, $261_2$. Forward canopy disconnect $261_2$ may provide a redundancy to forward canopy disconnect $261_1$. Forward canopy disconnect $261_1$ may be connected between first portion $116_1$ of canopy 116 and wire bundle 228. Forward canopy disconnect $261_2$ may be connected between first portion $116_1$ of canopy 116 and wire bundle 244. Forward canopy disconnects $261i$, $261_2$ may each include a first portion 263 and a second portion 265. First and second ESES sequencers $120_1$, $120_2$ are configured to determine whether first portions 263 have disconnected from second portions 265, and to fire their respective seat rocket catapult subsystems $126_1$, $126_2$ in response to determining that at least one of the first portions 263 has disconnected from its respective second portion 265.

Second clearance assembly $124_2$ may include aft canopy jettison rockets $207_1$, $207_2$ and aft jettison EEDs $209_1$, $209_2$. Aft canopy jettison rockets $207_1$, $207_2$ are configured to propel the second portion $116_2$ of canopy 116 away from the cockpit 108 (FIG. 1). Aft jettison EEDs $209_1$, $209_2$ are configured to fire (e.g., ignite a propellant in the energy chain of the EED) in response to receiving a deploy command from first ESES sequencer $120_1$ and/or second ESES sequencer $120_2$. Aft canopy jettison rockets $207_1$, $207_2$ are operably coupled to aft jettison EEDs $209_1$, $209_2$, such that aft canopy jettison rockets $207_1$, $207_2$ fire in response to aft jettison EEDs $209_1$, $209_2$ firing, and thereby expel second portion $116_2$ of canopy 116 from over second ejection seat 106. Aft canopy jettison rocket $207_1$ and aft jettison EED $209_1$ may be connected to wire bundle 228. Aft canopy jettison rocket $207_2$ and aft jettison EED $209_2$ may be connected to wire bundle 244. Aft canopy jettison rocket $207_2$ and aft jettison EED $209_2$ provide a redundancy for aft canopy jettison rocket $207_1$ and aft jettison EED $209_1$, respectively.

Second clearance assembly $124_2$ may include aft canopy disconnects $271_1$, $271_2$. Aft canopy disconnect $271_2$ may provide a redundancy to aft canopy disconnect $271_1$. Aft canopy disconnect $271_1$ may be connected between second portion $116_2$ of canopy 116 and wire bundle 228. Aft canopy disconnect $271_2$ may be connected between second portion $116_2$ of canopy 116 and wire bundle 244. Aft canopy disconnects $271_1$, $271_2$ may each include a first portion 273 and a second portion 275. First and second ESES sequencers $120_1$, $120_2$ are configured to determine whether first portions 273 have disconnected from second portions 275, and to fire their respective seat rocket catapult subsystems $126_1$, $126_2$ in response to determining that at least one of the first portions 273 has disconnected from its respective second portion 275.

Returning to FIG. 2A, in response to being powered on, first ESES sequencer $120_1$ also determines whether second ESES sequencer $120_2$ should be powered-on. First ESES sequencer $120_1$ may determine whether second ESES sequencer $120_2$ should be powered-on based on the seat identity and the ejection mode determinations. For example, in response to first ESES sequencer $120_1$ determining that first ejection seat 104 is seat 1 and that the ejection mode is either solo ejection mode or S2C ejection mode, first ESES sequencer $120_1$ determines that second ESES sequencer $120_2$ should not be powered on. In other words, in response to determining that only first ejection seat 104 will be ejection, first ESES sequencer $120_1$ determines not to send an activate signal to second ESES sequencer $120_2$. In response to first ESES sequencer $120_1$ determining that first ejection seat 104 is seat 1 and that the ejection mode is either dual ejection mode or S1C ejection mode, first ESES sequencer $120_1$ determines that second ESES sequencer $120_2$ should be powered on. In various embodiments, in response to determining that second ESES sequencer $120_2$ should be powered (e.g., in response to determining that second ejection seat 106 should also eject), first ESES sequencer $120_1$ sends an activate signal to second ESES sequencer $120_2$. The activate signal sent from first ESES sequencer $120_1$ may activate a second seat first auxiliary power source $180_2$ and/or a second seat second auxiliary power source $182_2$.

Each of second seat first auxiliary power source $180_2$ and second seat second auxiliary power source $182_2$ is connected to second ESES sequencer $120_2$ and is configured to supply power to second ESES sequencer $120_2$. Second seat second auxiliary power source $182_2$ may provide a redundancy to second seat first auxiliary power source $180_2$. In various embodiments, second seat first auxiliary power source $180_2$ and second seat second auxiliary power source $182_2$ may each comprise an electrically initiated thermal battery.

In accordance with various embodiments, if a power input has not already been supplied from second seat primary power source $140_2$ or second seat secondary power source $142_2$, second ESES sequencer $120_2$ determines the seat location, seat identity, and ejection mode in response to receiving a power input from second seat first auxiliary power source $180_2$ and/or second seat second auxiliary power source $182_2$.

As discussed above, in response to determining the location of second ejection seat 106 is aft seat, the identity of second ejection seat 106 is seat 2 (e.g., copilot seat), and that either dual ejection mode, S1C, or S2C ejection mode is selected, second ESES sequencer $120_2$ sends fire commands to rocket EED $212_2$ and rocket EED $214_2$ a preset time delay (e.g., a first number of milliseconds) after determining canopy 116 and/or second portion $116_2$ (FIG. 2C) has jettisoned. The preset time delay may be configured such that second seat rocket catapult subsystem $126_2$ fires before first seat rocket catapult subsystem $126_1$.

In response to being powered on, second ESES sequencer $120_2$ also determine whether first ESES sequencer $120_1$ should be powered-on. Second ESES sequencer $120_2$ may determine whether first ESES sequencer $120_1$ should be powered on based on the seat identity and the ejection mode determinations made by second ESES sequencer $120_2$. For example, in response to second ESES sequencer $120_2$ determining that it is located in a seat 2 and that the ejection mode is S1C ejection mode, second ESES sequencer $120_2$ determines that first ESES sequencer $120_1$ should not be powered on. In other words, in response to determining that only second ejection seat 106 will be ejection, second ESES sequencer $120_2$ determines not to send an activate signal to first ESES sequencer $120_1$. In response to second ESES sequencer $120_2$ determining that is located in a seat 2 and that the ejection mode is either dual ejection mode or S2C ejection mode, second ESES sequencer $120_2$ determines that first ESES sequencer $120_1$ should be powered on. In various embodiments, in response to determining that first ESES sequencer $120_1$ should be powered (e.g., in response to determining that first ejection seat 104 should also eject), second ESES sequencer $120_2$ sends an activate signal to first ESES sequencer $120_1$. The activate signal sent from second ESES sequencer $120_2$ may activate a first seat first auxiliary power source $180_1$ and/or a first seat second auxiliary power source $182_1$. Each of first seat first auxiliary power source $180_1$ and first seat second auxiliary power source $182_1$ is connected to first ESES sequencer $120_1$ and is configured to supply power to first ESES sequencer $120_1$. In various embodiments, first seat first auxiliary power source $180_1$ and first seat second auxiliary power source $182_1$ may each comprise an electrically initiated thermal battery.

In accordance with various embodiments, if a power input has not been supplied from first seat primary power source $140_1$ or first seat secondary power source $142_1$, first ESES sequencer $120_1$ determines the location of first ejection seat 104, the identity of first ejection seat 104, and the ejection mode, in response to receiving a power input from first seat first auxiliary power source $180_1$ and/or first seat second auxiliary power source $182_1$.

In accordance with various embodiments, first ESES sequencer $120_1$ is configured to control the deployment sequence (timing of firing) of the ejection seat subsystems of first ejection seat 104. For example, after deploying first seat rocket catapult subsystem $126_1$, first ESES sequencer $120_1$ may send a deploy command to first drogue parachute subsystem $132_1$ of first ejection seat 104. First drogue parachute subsystem $132_1$ is located on and deploys from first ejection seat 104. In response to receiving the deploy command from first ESES sequencer $120_1$, one or more drogue parachute mortars and/or other deployment components of first drogue parachute subsystem $132_1$ may fire to deploy a drogue parachute connected to first ejection seat 104.

In various embodiments, first ESES sequencer $120_1$ sends a deploy command to first main parachute subsystem $130_1$ of first ejection seat 104. First main parachute subsystem $130_1$ is located on and deploys from first ejection seat 104. In response to receiving the deploy command from first ESES sequencer $120_1$, one or more parachute mortars and/or other deployment components of first main parachute subsystem $130_1$ may fire to deploy a main parachute coupled to the occupant of first ejection seat 104.

In various embodiments, first ESES sequencer $120_1$ may send a deploy command to first restraint release subsystem $134_1$. First restraint release subsystem $134_1$ is located on first ejection seat 104. In response to receiving the deploy command from first ESES sequencer $120_1$, one or more EEDs, thrusters, cutters, and/or other deployment components of first restraint release subsystem $134_1$ may fire to release the occupant from first ejection seat 104.

In various embodiments, first ESES sequencer $120_1$ may send a deploy command to first STAPAC subsystem $136_1$. First STAPAC subsystem $136_1$ is located on first ejection seat 104. In response to receiving the deploy command from first ESES sequencer $120_1$, one or more EEDs, thrusters, rockets, and/or other deployment components of first STAPAC subsystem $136_1$ may fire to control the pitch of first ejection seat 104.

In various embodiments, first ESES sequencer $120_1$ may send a deploy command to first inertia reel subsystem $138_1$. First inertia reel subsystem $138_1$ is located on first ejection seat 104. In response to receiving the deploy command from first ESES sequencer $120_1$, one or more EEDs, thrusters, cutters, actuators, and/or other components of first inertia reel subsystem $138_1$ may fire to optimally position the occupant shoulder harness during ejection of first ejection seat 104. For example, first ESES sequencer $120_1$ may send the deploy command to first inertia reel subsystem $138_1$ prior to initiation of first seat rocket catapult subsystem $126_1$, such that the occupant upper body will be in a desired position when first ejection seat 104 is expelled from cockpit 108 (FIG. 1).

In accordance with various embodiments, first ESES sequencer $120_1$ determines the timing sequences for deploying the ejection seat subsystems based on the seat location, seat identity, and ejection mode determinations. For example, first ESES sequencer $120_1$ may be configured to implement a first sequence (or series of time delays) to fire each of first main parachute subsystem $130_1$, first drogue parachute subsystem $132_1$, first restraint release subsystem $134_2$, first STAPAC subsystem $136_1$, and/or first inertia reel subsystem $138_1$ in response to determining first ejection seat 104 is a forward seat and/or a seat 1 and/or that the ejection mode is solo or S2C. First ESES sequencer $120_1$ may be configured to implement a second sequence (or series of time delays) different from the first series to fire each of first main parachute subsystem $130_1$, first drogue parachute subsystem $132_1$, first restraint release subsystem $134_2$, first STAPAC subsystem $136_1$, and/or first inertia reel subsystem $138_1$, in response to determining first ejection seat 104 is forward seat and/or a seat 1 and/or that the ejection mode is dual or SIC.

Second ESES sequencer $120_2$ is configured to control the deployment sequence (timing of firing) of the ejection seat subsystems of second ejection seat 106. In accordance with various embodiments, second ESES sequencer $120_2$ determines the timing sequences for deploying ejection seat subsystems based on the seat location, seat identity, and/or ejection mode determinations. For example, second ESES sequencer $120_2$ may be configured to implement a first sequence (or series of time delays) to fire each of second main parachute subsystem $130_2$, second drogue parachute subsystem $132_2$, second restraint release subsystem $134_2$, second STAPAC subsystem $136_2$, and/or second inertia reel subsystem $138_2$ in response to determining second ejection seat 106 is an aft seat. Second ESES sequencer $120_2$ may be configured to implement a second sequence (or series of time delays) different from the first sequence to fire each of second main parachute subsystem $130_2$, second drogue parachute subsystem $132_2$, second restraint release subsystem $134_2$, second STAPAC subsystem $136_2$, and/or second inertia reel subsystem $138_2$, in response to determining second ejection seat 106 is forward seat and/or a seat 1.

In various embodiments, multi-seat ejection system 100 may also include an external canopy release handle 280, a first seat internal canopy release handle 282, and a second seat internal canopy release handle 284. External canopy release handle 280 is located outside cockpit 108, with momentary reference to FIG. 1, and is configured to allow emergency or maintenance personnel to deploy escape path clearance subsystem 124 and remove canopy 116 from over first and second ejection seats 104, 106 without expelling first ejection seat 104 and/or second ejection seat 106 (i.e., without firing first and second seat rocket catapult subsystems $126_1$, $126_2$ and without deploying first and second ejection seat subsystems $130_1$, $130_2$, $132_1$, $132_2$, $134_1$, $134_2$, $136_1$, $136_2$, $138_1$, $138_2$). First seat internal canopy release handle 282 and second seat internal canopy release handle 284 are located inside cockpit 108 and are configured to allow an occupant of first ejection seat 104 and an occupant of second ejection seat 106, respectively, to deploy escape path clearance subsystem 124 and remove canopy 116 without expelling first ejection seat 104 and/or second ejection seat 106 (i.e., without firing first and second seat rocket catapult subsystems $126_1$, $126_2$ and without deploying first and second ejection seat subsystems $130_1$, $130_2$, $132_1$, $132_2$, $134_1$, $134_2$, $136_1$, $136_2$, $138_1$, $138_2$).

External canopy release handle 280 is operably coupled to a power source 286. First seat internal canopy release handle 282 is operably coupled to a power source 288. Second seat internal canopy release handle 284 is operably coupled to a power source 290. Power source 286 is configured to activate in response to actuation of external canopy release handle 280. Power source 288 is configured to activate in response to actuation of first seat internal canopy release handle 282. Power source 290 is configured to activate in response to actuation of second seat internal canopy release handle 284. Power sources 286, 288 may be connected to wire bundle 230. Upon activation, power sources 286, 288 output power (e.g., current) to fire first thruster EED $204_1$ and first jettison EED $206_1$. Power source 290 may be connected to wire bundle 246. Upon activation, power source 290 outputs power (e.g., current) configured to fire second thruster EED $204_2$ and second jettison EED $206_2$. Power sources 286, 288, 290 may each comprise a thermal battery, or any other suitable power source that may be activated in response to actuation of the power source's respective canopy release handle.

In various embodiments, multi-seat ejection system 100 may include a first test port $292_1$ electrically connected to first ESES sequencer $120_1$. First test port $292_1$ may be a connector located on first ejection seat 104. First test port $292_1$ is configured to engage a connecter of a testing module (e.g., a wired or wireless link connected to a laptop, a tablet, an electronic test seat, or any component capable of running testing software). First ESES sequencer $120_1$ is configured to operate in a test mode in response to the testing module being electrically connected to first test port $292_1$. For example, in test mode, the EEDs of multi-seat ejection system 100 do not fire. The testing module when connected to first test port $292_1$ may verify the functionality of the microcontrollers and the sequencer logic of first ESES sequencer $120_1$ and/or may run a low voltage through the pins of the connectors and thru the wires bundles to determine that first ESES sequencer $120_1$ and multi-seat ejection system 100 is properly assembled and that there is electric continuity between the connectors and other circuitry of multi-seat ejection system 100. A second test port 2922, similar to first test port $292_1$, may be electrically connected to second ESES sequencer $120_2$ and located on second ejection seat 106.

Configuring first and second ESES sequencers $120_1$, $120_2$ to connect to and control the ejection seat subsystems and the aircraft escape subsystems allows multi-seat ejection system 100 to operate with one sequencer located on each of first ejection seat 104 and second ejection seat 106. In this regard, first and second ESES sequencers $120_1$, $120_2$ allow for multi-seat ejection systems, which do not include a separate sequencer located on the aircraft. Eliminating the aircraft sequencer tends to reduce ejection system weight, part count, and costs. In addition, connecting the subsystems to a single sequencer improves reliability and may allow for simpler installation and/or decreased assembly times.

With reference to FIG. 3, a schematic of a multi-seat ejection system 300 is illustrated. Multi-seat ejection system 300 may be installed in aircraft 102, with momentary reference to FIG. 1, in place of multi-seat ejection system 100. Ejection system 300 is similar to multi-seat ejection system 100 in FIG. 2A. Accordingly, in FIG. 3, elements with like element numbering, as depicted in FIG. 2A, are intended to be the same and will not necessarily be repeated for the sake of brevity.

In accordance with various embodiments, ejection system 300 may include an escape path clearance subsystem 302 in place of escape path clearance subsystem 124 in FIG. 2A. In various embodiments, escape path clearance subsystem 302 comprises a canopy breaking system (e.g., a canopy severance system, a canopy fracture system, or any system wherein a portion of the canopy 116 located over first and second ejection seats 104, 106 is broken and/or weakened). Escape path clearance subsystem 302 includes a detonating cord 304 configured to sever or fracture canopy 116, thereby removing or weakening canopy 116 over first and second ejection seats 104, 106. While escape path clearance subsystem 302 described as single clearance assembly, wherein detonating cord 304 configured to fracture canopy 116 over both first ejection seat 104 and second ejection seat 106, it is contemplate and understood that in various embodiments, escape path clearance subsystem 302 may include a first clearance assembly configured to fracture a first portion $116_1$ (FIG. 2C) of canopy 116 located over first ejection seat 104 and a second clearance assembly configured to fracture a second portion $116_2$ (FIG. 2C) of canopy 116 located over second ejection seat 106. In this regard, first and second ESES sequencers $120_1$, $120_2$ may determine whether to fire the first clearance assembly, the second clearance assembly, or both the first and second clearance assemblies based on their respective seat location, seat identity, and ejection mode determinations.

In accordance with various embodiments, a first detonator 310 of escape path clearance subsystem 302 is operably coupled (e.g., electrically connected) to wire bundle 230, and a second detonator 312 of escape path clearance subsystem 302 is operably coupled (e.g., electrically connected) to wire bundle 246. For example, first detonator 310 may be connected to connector 224 of disconnect 220, and second detonator 212 may be connected to connector 240 of disconnect 222. Second detonator 312 may provide a redundancy to first detonator 310. First and second detonators 310, 312 are operably coupled to detonating cord 304. In response to receiving a deploy command from first ESES sequencer $120_1$ and/or second ESES sequencer $120_2$, first and second detonators 310, 312 fire, thereby causing detonating cord 304 to sever, or fracture, canopy 116.

In various embodiments, first ESES sequencer $120_1$ may be configured to send the fire commands to rocket EEDs $212_1$, $214_1$ a preset time delay (e.g., 0.1 seconds, 0.2 seconds, 0.3 seconds, etc.) after sending the fire command to first and second detonators 310, 312. First ESES sequencer $120_1$ may select the preset time delay for firing rocket EEDs $212_1$, $214_1$ based on the seat location, seat identity, and ejection mode determinations made by first ESES sequencer $120_1$. First ESES sequencer $120_1$ may be configured to implement a first time delay for firing rocket EEDs $212_1$, $214_1$ in response to determining that only first ejection seat 104 will ejection, and to implement a second time delay for firing rocket EEDs $212_1$, $214_1$, which is longer than the first time delay, in response to determining that both first ejection seat 104 and second ejection seat 106 will eject. The second time delay is configured such that first seat rocket catapult subsystem $126_1$ will deploy after second seat rocket catapult subsystem $126_2$.

Similarly, second ESES sequencer $120_2$ may be configured to send fire commands to rocket EEDs $212_2$, $214_2$ a preset time delay after sending fire commands to first and second detonators 310, 312. Second ESES sequencer $120_2$ may select the preset time delay for firing rocket EEDs $212_2$, $214_2$ based on the seat location, seat identity, and ejection mode determinations made by second ESES sequencer $120_2$. For example, in response to determining that second ejection seat 106 is an aft ejection seat, second ESES sequencer $120_2$ may employ a time delay configured to cause second seat rocket catapult subsystem $126_2$ to deploy immediately after firing first and second detonators 310, 312 and/or to deploy prior to first seat rocket catapult subsystem $126_1$.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An article of manufacture including a tangible, non-transitory computer-readable storage medium having instructions stored thereon for controlling deployment of aircraft escape subsystems and ejection seat subsystems and that, in response to execution by a first sequencer, cause the first sequencer to perform operations comprising:
   receiving, by the first sequencer, a power input;
   determining, by the first sequencer, a seat location and a seat identity of a first ejection seat in which the first sequencer is installed;
   determining, by the first sequencer, an ejection mode;
   sending, by the first sequencer, a first deploy command to an escape path clearance subsystem;
   determining, by the first sequencer, a deployment sequence for a seat rocket catapult subsystem and a plurality of ejection seat subsystems of the first ejection seat based on the seat location, the seat identity, and the ejection mode;
   sending, by the first sequencer, a second deploy command to the seat rocket catapult subsystem; and
   sending, by the first sequencer, a series of third deploy commands to the plurality of ejection seat subsystems.

2. The article of claim 1, wherein the operations further comprise:
   receiving, by the first sequencer, an output from an ejection mode selector;
   determining, by the first sequencer, the ejection mode based on the output from the ejection mode selector; and
   determining, by the first sequencer, whether to power on a second sequencer located in a second ejection seat based on the seat identity and the ejection mode.

3. The article of claim 2, wherein the operations further comprise:
   determining, by the first sequencer, whether a first connector has disconnected from a second connector, wherein a first wire bundle is connected between the first connector and the escape path clearance subsystem, and wherein a second wire bundle is connected between the second connector and the first sequencer; and
   sending, by the first sequencer, the second deploy command to the seat rocket catapult subsystem in response to determining the first connector has disconnected from the second connector.

4. The article of claim 3, wherein the operations further comprise determining, by the first sequencer, a time delay for sending the second deploy command to the seat rocket catapult subsystem after determining the first connector has disconnected from the second connector, wherein the time delay is determined based on the seat location, the seat identity, and the ejection mode.

5. The article of claim 4, wherein the operations further comprise determining, by the first sequencer, whether to fire a first clearance assembly of the escape path clearance subsystem, a second clearance assembly of the escape path clearance subsystem, or both the first clearance assembly and the second clearance assembly, based on the seat location, the seat identity, and the ejection mode, wherein the first clearance assembly is configured to remove a first portion of an aircraft canopy and the second clearance assembly is configured to remove a second portion of the aircraft canopy.

6. The article of claim 5, wherein the sending, by the first sequencer, the first deploy command to the escape path clearance subsystem comprises: sending, by the first sequencer, the first deploy command to at least one of the first clearance assembly or the second clearance assembly.

7. The article of claim 2, wherein receiving, by the first sequencer, the power input comprises at least one of:
   receiving, by the first sequencer, the power input from a first seat primary power source, the first seat primary power source being configured to supply current to the first sequencer in response to actuation of a first seat handle; or
   receiving, by the first sequencer, the power input from a first seat auxiliary power source, the first seat auxiliary power source being configured to begin supply current to the first sequencer in response a signal output by the second sequencer.

8. A multi-seat ejection system, comprising:
   a first ejection seat including a first sequencer;
   a second ejection seat including a second sequencer;
   an escape path clearance subsystem operably coupled to the first sequencer and the second sequencer;

a first seat rocket catapult subsystem configured to expel the first ejection seat and configured to receive a first deploy command from the first sequencer;
a second seat rocket catapult subsystem configured to expel the second ejection seat and configured to receive a second deploy command from the second sequencer;
a plurality of first ejection seat subsystems located on the first ejection seat and configured to receive a series of third deploy commands from the first sequencer; and
a plurality of second ejection seat subsystems located on the second ejection seat and configured to receive a series of fourth deploy commands from the second sequencer.

9. The multi-seat ejection system of claim 8, further comprising:
a first seat primary power source connected to the first sequencer;
a first seat handle configured to activate the first seat primary power source;
a first seat auxiliary power source connected to the first sequencer and configured to supply current to the first sequencer in response to receiving a first activate signal output by the second sequencer;
a second seat primary power source connected to the second sequencer;
a second seat handle configured to activate the second seat primary power source; and
a second seat auxiliary power source connected to the second sequencer and configured to supply current to the second sequencer in response to receiving a second active signal output by the first sequencer.

10. The multi-seat ejection system of claim 9, further comprising:
a first connector including a first pin configuration, wherein the first sequencer is configured to determine a seat location of the first ejection seat and a seat identity of the first ejection seat based on the first pin configuration; and
a second connector including a second pin configuration, wherein the second sequencer is configured to determine a seat location of the second ejection seat and a seat identity of the second ejection seat based on the second pin configuration.

11. The multi-seat ejection system of claim 10, further comprising an ejection mode selector in communication with the first sequencer and the second sequencer.

12. The multi-seat ejection system of claim 11, wherein the first sequencer is configured to determine an ejection mode based on an output from the ejection mode selector, and wherein the first sequencer determines a first deployment sequence for the first seat rocket catapult subsystem and the plurality of first ejection seat subsystems based on the seat location of the first ejection seat, the seat identity of the first ejection seat, and the ejection mode.

13. The multi-seat ejection system of claim 12, wherein the second sequencer is configured to determine a second deployment sequence for the second seat rocket catapult subsystem and the plurality of second ejection seat subsystems based on the seat location of the second ejection seat, the seat identity of the second ejection seat, and the ejection mode.

14. The multi-seat ejection system of claim 13, wherein the first sequencer is configured to determine whether to power-on the second sequencer based on the seat identity of the first ejection seat and the ejection mode.

15. The multi-seat ejection system of claim 14, wherein the escape path clearance subsystem includes:

a first clearance assembly configured to at least one of remove or weaken a first portion of an aircraft canopy; and
a second clearance assembly configured to at least one of remove or weaken a second portion of the aircraft canopy, and wherein the first sequencer is configured to determine whether to fire the first clearance assembly, the second clearance assembly, or both the first clearance assembly and the second clearance assembly based on the seat location of the first ejection seat, the seat identity of the first ejection seat, and the ejection mode.

16. An ejection seat, comprising:
a first sequencer
a primary power source connected to the first sequencer;
a first seat auxiliary power source connected to the first sequencer;
a first ejection seat subsystem in communication with the first sequencer; and
a tangible, non-transitory computer-readable storage medium having instructions stored thereon that, in response to execution by the first sequencer, cause the first sequencer to perform operations comprising:
receiving, by the first sequencer, a power input from at least one of the primary power source or the first seat auxiliary power source;
determining, by the first sequencer, a location of the ejection seat and an identity of the ejection seat;
determining, by the first sequencer, an ejection mode;
determining, by the first sequencer, a deployment sequence for a seat rocket catapult subsystem and the first ejection seat subsystem based on the location of the ejection seat, the identity of the ejection seat, and the ejection mode;
sending, by the first sequencer, a first deploy command to an escape path clearance subsystem;
sending, by the first sequencer, a second deploy command the seat rocket catapult subsystem; and
sending, by the first sequencer, a third deploy command to the first ejection seat subsystem.

17. The ejection seat of claim 16, wherein the operations further comprise:
receiving, by the first sequencer, an output from an ejection mode selector;
determining, by the first sequencer, the ejection mode based on the output from the ejection mode selector; and
determining, by the first sequencer, whether to power-on a second sequencer located in a second ejection seat based on the identity of the ejection seat and the ejection mode.

18. The ejection seat of claim 17, wherein the operations further comprise:
determining, by the first sequencer, whether a first connector has disconnected from a second connector, wherein a first wire bundle is connected between the first connector and the escape path clearance subsystem, and wherein a second wire bundle is connected between the second connector and the first sequencer; and
sending, by the first sequencer, the second deploy command to the seat rocket catapult subsystem in response to determining the first connector has disconnected from the second connector.

19. The ejection seat of claim 18, wherein the operations further comprise determining, by the first sequencer, a time delay for sending the second deploy command to the seat rocket catapult subsystem, wherein the time delay is determined based on the location of the ejection seat, the identity of the ejection seat, and the ejection mode.

20. The ejection seat of claim 19, wherein the operations further comprise determining, by the first sequencer, whether to fire a first clearance assembly of the escape path clearance subsystem, a second clearance assembly of the escape path clearance subsystem, or both the first clearance assembly and the second clearance assembly, based on the location of the ejection seat, the identity of the ejection seat, and the ejection mode, wherein the first clearance assembly is configured to remove a first portion of an aircraft canopy and the second clearance assembly is configured to remove a second portion of the aircraft canopy.

* * * * *